(12) United States Patent
Karim et al.

(10) Patent No.: US 10,627,530 B2
(45) Date of Patent: Apr. 21, 2020

(54) METHOD AND APPARATUS FOR A HIGH RESOLUTION, HIGH SPEED RADIATION IMAGING

(71) Applicant: KA Imaging Inc., Kitchener (CA)

(72) Inventors: Karim S Karim, Kitchener (CA); Chris Scott, Kitchener (CA); Yunzhe Li, Kitchener (CA)

(73) Assignee: KA IMAGING INC., Kitchener, Ontario (CA)

(*) Notice: Subject to any disclaimer, the term of this patent is extended or adjusted under 35 U.S.C. 154(b) by 0 days.

(21) Appl. No.: 15/972,762

(22) Filed: May 7, 2018

(65) Prior Publication Data
US 2019/0339398 A1    Nov. 7, 2019

(51) Int. Cl.
*G01T 1/17*    (2006.01)

(52) U.S. Cl.
CPC ..................... *G01T 1/17* (2013.01)

(58) Field of Classification Search
None
See application file for complete search history.

(56) References Cited

U.S. PATENT DOCUMENTS

| | | | | |
|---|---|---|---|---|
| 5,715,292 A | * | 2/1998 | Sayag | A61B 6/4233 250/368 |
| 2009/0290680 A1 | * | 11/2009 | Tumer | G01T 1/247 378/62 |
| 2016/0161426 A1 | * | 6/2016 | Wober | G01N 23/046 378/19 |

\* cited by examiner

*Primary Examiner* — Edwin C Gunberg
(74) *Attorney, Agent, or Firm* — Gowling WLG (Canada) LLP; Jeffrey W. Wong

(57) ABSTRACT

This method and system provide an imaging system for producing static and dynamic images from electromagnetic radiation such as x-rays and high-energy electrons. The detector includes a top electrode layer, a photoconducting layer and a bottom electrode layer. Within the bottom electrode layers are a set of pixel circuits for sensing the radiation. The photoconducting layer has a thickness at least three times greater than the pitch of one of the individual pixel circuits.

15 Claims, 6 Drawing Sheets

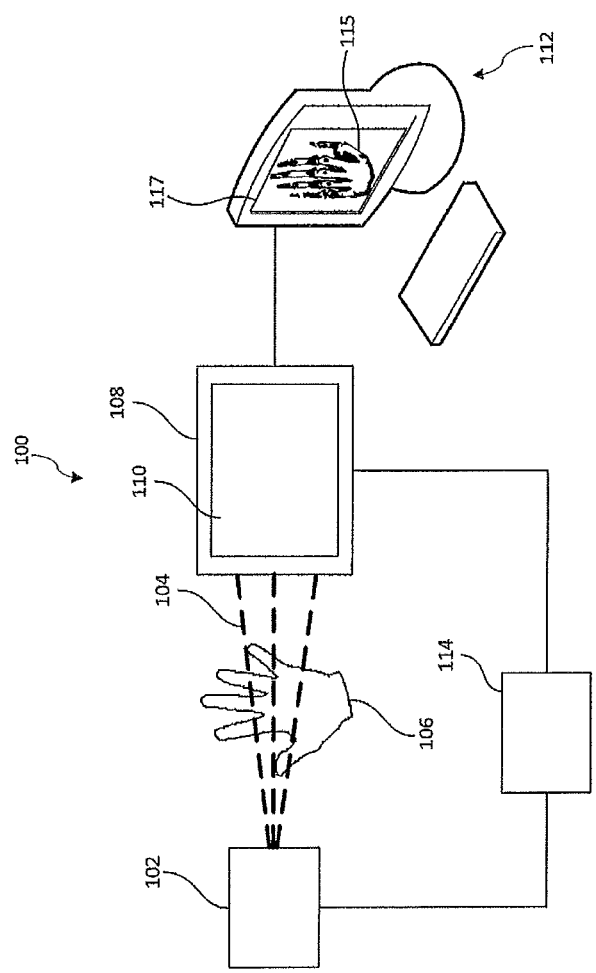

|     | 502 |     | 502 |     | 502 |     | 502 |
| --- | --- | --- | --- | --- | --- | --- | --- |
| 500 | 500 | 500 | 500 | 500 | 500 | 500 | 500 |
| 500 | 500 | 500 | 500 | 500 | 500 | 500 | 500 |
| 500 | 500 | 500 | 500 | 500 | 500 | 500 | 500 |
| 500 | 500 | 500 | 500 | 500 | 500 | 500 | 500 |
| 500 | 500 | 500 | 500 | 500 | 500 | 500 | 500 |
| 500 | 500 | 500 | 500 | 500 | 500 | 500 | 500 |
| 500 | 500 | 500 | 500 | 500 | 500 | 500 | 500 |
| 500 | 500 | 500 | 500 | 500 | 500 | 500 | 500 |

Figure 5

METHOD AND APPARATUS FOR A HIGH RESOLUTION, HIGH SPEED RADIATION IMAGING

FIELD OF THE DISCLOSURE

The disclosure is generally directed at image detection and, more specifically, is directed at a method and apparatus for high resolution, high speed radiation imaging.

BACKGROUND OF THE DISCLOSURE

Imaging devices often use amorphous semiconductor or semiconductor layers (made of materials such as amorphous silicon, organic semiconductors or amorphous selenium) integrated with pixelated electronic readout arrays to image objects using radiation such as X-ray, gamma rays, high-energy electrons, and beta particles. However, amorphous semiconductors are especially well known to suffer from memory effects including image lag (which manifests itself as persistence of the acquired image after acquisition is completed) due to charge trapping within the semiconductor bulk as well as at the interfaces between layers. The subsequent erratic release of this trapped charge further increases the image lag.

This lag typically translates into slower speed readouts that limit or reduce large area detector operation speed. This is problematic as mammography tomosynthesis X-ray detectors usually need to acquire data at greater than a single frame per second. Moreover, charge trapped near a particular sensing pixel can result in the image being recognized on adjacent pixels across multiple frames resulting in a degradation of spatial resolution.

Spatial resolution is often measured using the modulation transfer function (MTF) metric and MTF degradation serves to fundamentally limit high-resolution X-ray detectors that are preferred for their ability to resolve small feature sizes. This charge trapping can affect many different imaging applications.

Emerging applications such as mammography tomosynthesis or mammography-computed tomography (CT) typically require high-resolution (i.e. high MTF) X-ray detectors with minimal lag.

Thus, there is provided a novel method and apparatus for a high resolution, high speed radiation imaging.

SUMMARY OF THE DISCLOSURE

In one embodiment, the disclosure is directed at a high-resolution radiation detector that is capable of operating at high frame rates with low lag, especially for use in emerging imaging applications such as, but not limited to, mammography tomosynthesis or mammography-computed tomography (CT).

In one method of the disclosure, there is provided a method of high-resolution radiation detection that provides low lag at high frame rates.

In one aspect of the disclosure, there is provided a system for producing images from incident radiation including a top electrode layer; a photoconducting layer; a set of bottom electrodes; a substrate layer; and a set of pixel circuits integrated within the set of bottom electrodes; wherein a thickness of the photoconducting layer is at least three times thicker than a pitch of an individual pixel circuit.

In another aspect, the pitch is less than or equal to about 25 microns. In a further aspect, each pixel circuit in the set of pixel circuits includes a storage capacitor; and a pixel readout circuit. In yet another aspect, the pixel readout circuit is made from CMOS, metal oxide, organic, or poly-silicon semiconductor technology. In a further aspect, the photoconducting layer is made from amorphous selenium, perovskites, organic semiconductor, HgI2, PbO, PbI or TlBr.

In another aspect, the top electrode layer is an aluminum, gold, chromium or silver layer. In another aspect, each of the set of bottom electrodes is an aluminum bottom electrode.

In another aspect of the disclosure, there is provided a method of high-speed imaging including sensing, via a detector having a set of pixel circuits with a pitch size of less than or equal to 25 microns and a photoconducting layer having a thickness at least three times greater than the pitch size, a set of received radiation signals; and translating received radiation signals into corresponding values for each of the set of pixel circuits.

In another aspect, the method further includes binning the corresponding values of predetermined groupings of pixel circuits. In another aspect, the method further includes transmitting the binned values to a processor. In yet a further aspect, the method further includes transmitting the corresponding values to a processor. In yet another method, the photoconducting layer has a thickness of at least five times the pixel pitch.

BRIEF DESCRIPTION OF THE DRAWINGS

Embodiments of the disclosure will now be described, by way of example only, with reference to the attached drawings, in which:

FIG. 1a illustrates a schematic diagram of a system for radiographic imaging;

FIG. 5 is a schematic diagram of a set of small pixels.

DETAILED DESCRIPTION OF THE DISCLOSURE

Figure 1B:
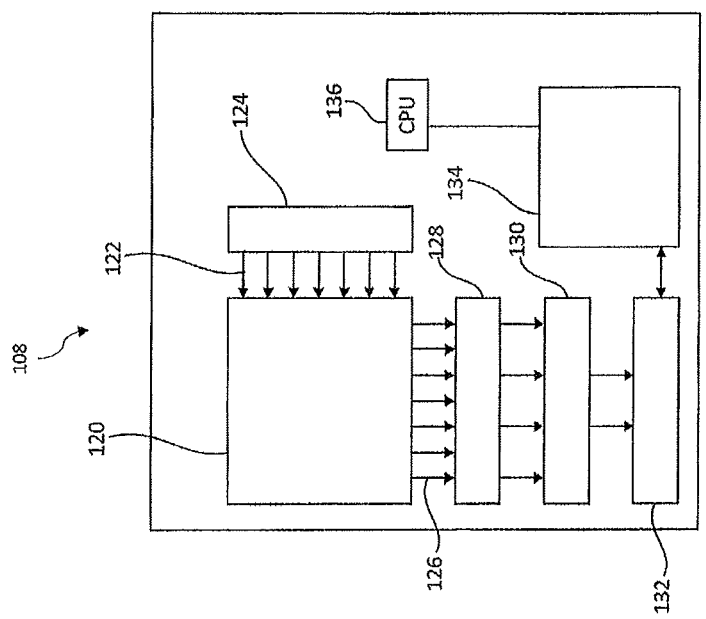
FIG. 1b is a schematic diagram of a radiography detector system.

The disclosure is directed at a method and system for high radiation, high speed imaging and/or detection. The system includes a photosensitive layer sandwiched between a pair of electrode layers, which in one embodiment may be seen as a top electrode layer and a bottom electrode layer. The system further includes a substrate layer. The bottom electrode layer further includes a set of pixel circuits, each pixel circuit having a pitch, p. In a preferred embodiment, the thickness of the photosensitive layer is at least three, but preferably five, times greater than the pitch, p, of the pixel circuit.

With new emerging applications such as mammography tomosynthesis or mammography-computed tomography (CT), the current disclosure may provide benefits over current systems. In mammography, it is advantageous to acquire small feature sizes in order to not only detect the presence of micro-calcifications, but to also examine their shape and structure which can act as a biomarker for cancer. For CT and tomosynthesis applications, both require the acquisition of multiple frames in a short amount of time, to minimize or reduce both excessive radiation exposure to the patient and also the discomfort associated with breast compression (in the case of tomosynthesis). The system and method of the disclosure may provide these advantages.

Turning to FIG. 1a, a schematic diagram of a radiographic imaging environment, or system is shown. The system 100 includes an X-ray radiation source 102 that generates X-ray radiation, in the form of a set of X-ray beams 104, that is transmitted towards an object of interest 106 such as, in the current Figure, a patient's hand, for imaging by a radiography detector system 108. In the present disclosure, the radiography detector system 108 preferably includes a large area, flat-panel detector based on active matrix technologies to achieve or produce an image of the object 106. In general, the object 106 to be imaged is positioned between the X-ray radiation source 102 and the radiography detector system 108. X-rays, which pass through the object 106, interact with the radiography detector system 108.

In direct imaging, the X-rays generate electronic charge within the radiography detector system 108 such that there is no need for a scintillator 110. In indirect imaging, the X-rays generate light photons as they pass through a phosphor screen or scintillator 110 within the radiography detector system 108. Different materials are contemplated for the scintillator including, but not limited to, Cesium Iodide (CsI), Gadolinium oxysulfide (GOS) or Calcium Tungsten Oxide (CaWO4). These indirectly generated light photons then further generate electronic charge within the radiography detector system 108.

The image 115 that is produced by the radiography detector system 108 can then be viewed on a display 117 of a computer 112 or computing system. For some radiography detector systems 108, synchronization hardware 114 may be necessary to obtain the correct timing between the X-ray source 102 and the radiography detector system 108 that is sampling the impinging set of X-ray beams 104.

FIG. 1b is a schematic diagram of components of one embodiment of a radiography detector system. In the current embodiment, the radiography detector system 108 includes an active matrix pixel array 120 having a two-dimensional matrix of pixel elements where electronic charges generated, directly or indirectly, by incident X-rays are sensed and stored. To access the stored charge at each pixel, gate lines 122 are driven, preferably sequentially, by a row switching control or controller 124 causing all pixels in one row of the active matrix pixel array 120 to output their stored charge onto data lines 126 that are coupled to charge amplifiers 128 at the end of each active matrix pixel array 120 column. The charge amplifiers 128 may also perform a multiplexing function in addition to the amplifying function. The charge amplifiers 128 send the pixel charge data to analog-to-digital converters (A/D's) 130, where the analog signal is converted to a digital representation. These digital representations are then stored in memory 132 awaiting transmission to the computer 112 at a time determined by the control logic 134. The transmission of the digital representations may be performed by a processor or central processing unit (CPU) 136.

Figure 2:
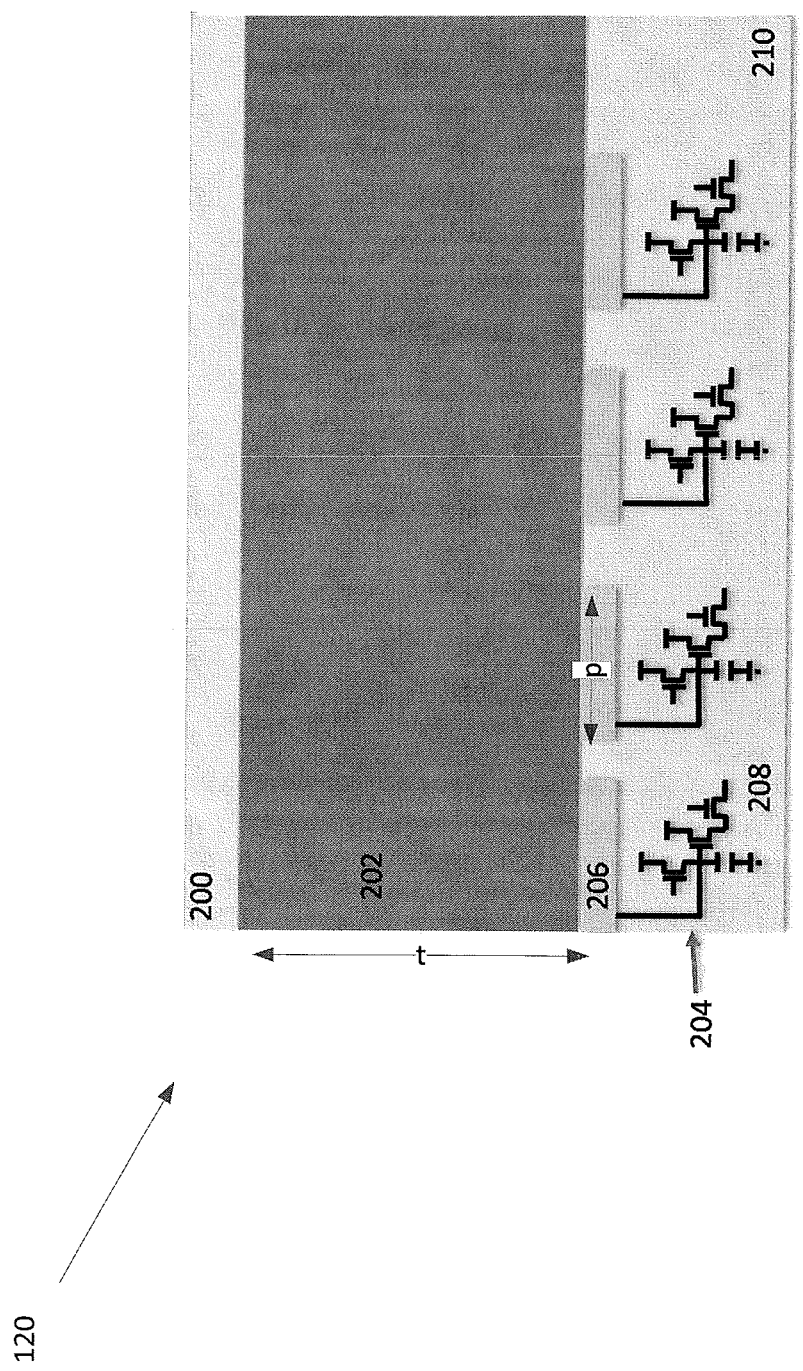
FIG. 2 is a schematic diagram of a pixel array for use in the detector system of FIG. 1b.

Turning to FIG. 2, a schematic diagram of a pixel array 120 for use in the system of the disclosure is shown. FIG. 2 is a cross-sectional view of a series of adjacent pixels within the pixel array. In the current embodiment, the pixel array 120 includes a top electrode layer 200, a photoconducting layer 202, a set of pixel readout circuits 204, each pixel readout circuit 204 including a bottom pixel electrode 206 and a storage capacitor and pixel readout circuit 208, and a substrate layer 210. The bottom electrodes 206 may collectively be seen as a bottom electrode layer. In one embodiment, the pixel readout circuit, or pixel circuit, may be embedded into the substrate layer as is the case with CMOS X-ray detectors, however, they may also be deposited on top of the substrate layer as is the case with thin film X-ray detectors e.g. amorphous silicon, metal oxide, organic or polysilicon semiconductors. FIG. 2 provides a schematic diagram of the pixel array, however, one skilled in the art would understand how the bottom electrode layer and the substrate layer may be implemented.

Although not shown, optional blocking layers (such as disclosed in U.S. Pat. No. 9,269,838 to Karim et al., issued on Feb. 23, 2016, which is hereby incorporated by reference) may be included in the detector. For instance, at least one polyimide layer, as discussed in U.S. Pat. No. 9,269,838, may be placed adjacent to the top and bottom electrode layers and the photosensitive layer.

As can be seen in FIG. 2, a width, or pitch, of each of the bottom electrodes can be represented by the letter 'p'. In a preferred embodiment, a thickness 't' of the photoconducting layer 202 is at least three, but preferably at least five, times greater than the pitch, p, of the bottom electrode. This relationship between 'p' and 't' provides advantages over current systems that were previously unknown.

In one specific embodiment, a thin gold layer is used for the top electrode layer 200, the photoconducting layer 202 is an amorphous selenium layer and the set of, preferably, aluminum, bottom pixel electrodes 206 include a corresponding storage capacitor and CMOS active pixel sensor circuit 208 embedded in a crystalline silicon substrate layer 210.

Instead of gold, the top electrode layer 200 may also be aluminum, chromium, silver or other conductive materials. In one embodiment, the pixel array 120 may include 1 million such pixel elements in a 1000×1000 active matrix configuration, although in the current Figure, only four pixel elements are shown. Larger density active matrix configuration can also be contemplated. Moreover, the active pixel sensor circuit could be replaced by alternate pixel readout circuits including, but not limited to, passive pixel circuits or even photon counting pixel circuits.

Alternatively, instead of utilizing CMOS pixel arrays or technology, other high-resolution transistor array technologies that are capable of achieving small pixel elements such as, but not limited to, poly-Si, metal oxide, organic thin-film transistors (TFTs) or polysilicon semiconductor technology can be employed. In another alternative embodiment, instead of amorphous selenium, other large area electron-hole radiation detecting semiconductor materials such as, but not limited to, perovskites, organic semiconductor materials, CdZnTe, CdTe, HgI2, PbO, PbI or TlBr can also be used for the photoconducting layer 202.

In a more specific embodiment, the pitch of each pixel circuit (or bottom electrode) is 7.8 um whereby the overall pixel array is a 1 MPixel CMOS pixel array. In experimentation, this specific pixel array was integrated with amorphous selenium photoconducting layers of varying thickness (typically 20 um or more) such that the thickness of the photoconducting layer was at least three times greater than the pitch of a pixel.

Figure 3B:
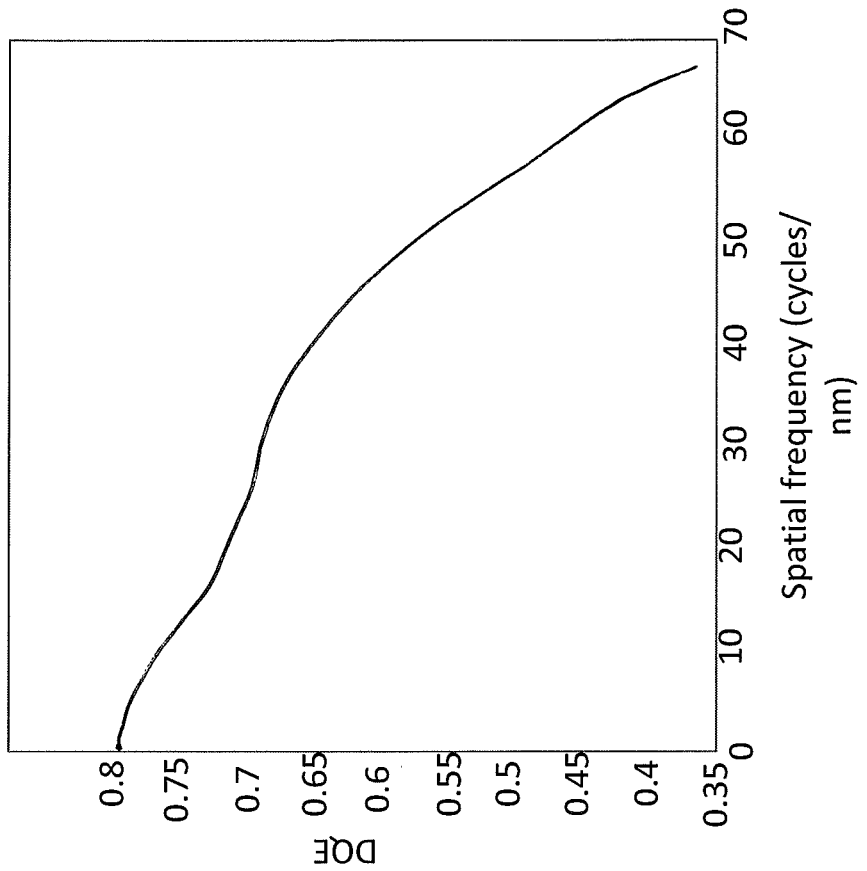
FIG. 3b is a graph showing DQE vs Spatial Frequency.
Figure 3A:
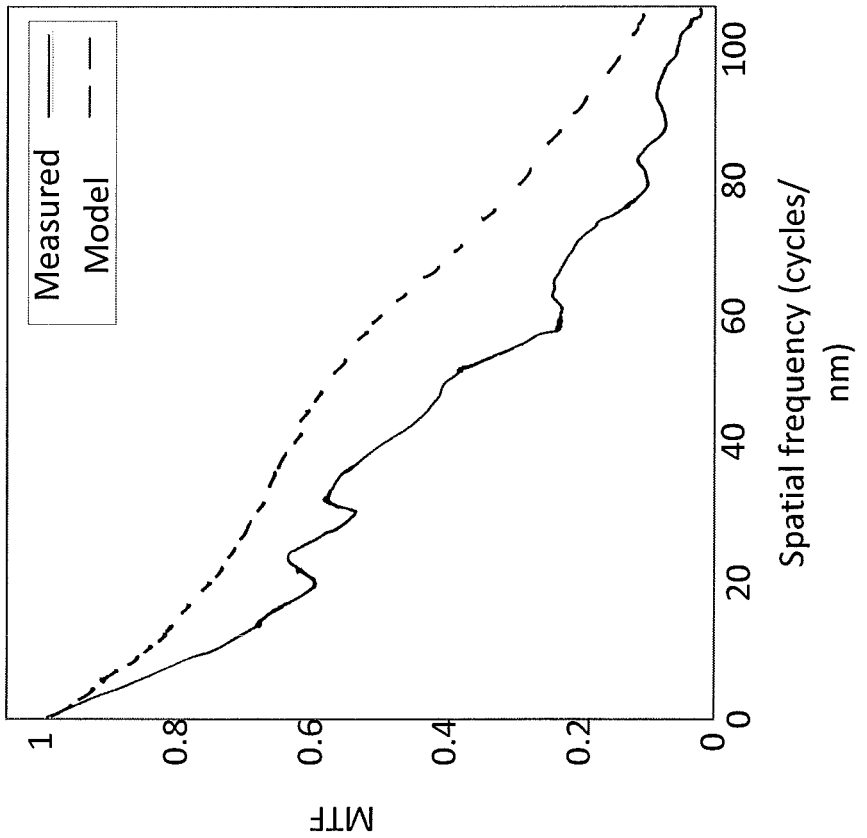
FIG. 3a is a graph showing MTF vs Spatial Frequency.

Through experimentation, this embodiment showed that there was imaging with minimal lag at 5 fps and higher, an advantage that was not previously known. Moreover, using this embodiment achieved high MTF values approaching the Nyquist frequency and excellent detective quantum efficiency implying quantum noise limited imaging (see graphs of FIG. 3). Further testing of different ratios between 't' and 'p' was also performed as outlined below.

In further experiments, testing was performed on CMOS pixel arrays having pixels pitches of sizes ranging from 5.5 microns to 25 microns with photoconducting layers of thickness 20 to 200 micrometers and greater. In each experiment it was noted that there were beneficial effects of the "near-field effect" on lag in each of the embodiments tested. As will be understood, in each of these embodiments, the photoconducting layer was at least three, but preferably at least five, times thicker than the pixel pitch to reduce lag. In embodiments where the thickness of the photoconducting layer was at around 3 times the pixel pitch, there was some lag (typically up to 3% after the first frame). While not usually beneficial, it is understood that for some applications, a small amount of lag may be tolerable and, as such, the system of the disclosure may function with a ratio of at least three between the thickness of the photoconducting layer and the pitch of a pixel whereby the pitch of the pixels are seen as small pixels and less than or equal to about 25 microns.

In contrast, commercial amorphous selenium TFT pixel array detectors that have a larger pixel size (70 or 85 microns) and a selenium, or photoconducting, layer, thickness ranging from 0.3 of 1 mm continue to suffer from excessive first frame lag (>5%) and low frame rates (<1 fps). It can be seen from these experiments that the advantages of the "near-field effect" of the embodiments of the disclosure provide greater benefits in lag reduction and MTF improvement for pixels having smaller pitches (25 micron and smaller) than it does for pixels having larger pitches.

The disclosed embodiment can also be extended to achieve improved scanning and readout times by incorporating a unipolar charge sensing Frisch grid approach such as disclosed in U.S. Pat. No. 8,129,688 issued to Mar. 6, 2012 to Karim et al. which is hereby incorporated by reference.

It is known that multiple adjacent pixels may be binned together to artificially create a larger pixel, which can yield a higher SNR, even at low radiation exposures. Binning is a method that aggregates the data from multiple adjacent pixels into a single "larger" pixel element (either via hardware, software or firmware) to improve the pixel SNR since signal increases linearly while noise, coming from independent sources, increases in quadrature (i.e. as a square root function).

However, one unique method of operating the disclosed small pixel detector to achieve a high SNR while maintaining fast readout times involves binning smaller pixels to achieve high SNR while still benefiting from the 'near field effect' to achieve high speed image acquisition with low lag and high MTF performance. Here, the image data is acquired using small pixel elements where the thickness of the photoconducting layer is around at least 3 (but preferably 5) times the pixel pitch. A high SNR image can be obtained from the "larger" pixels artificially constructed using binned pixel elements. A comparable large pixel detector could achieve high SNR, however, it would suffer from image lag and MTF degradation during the image acquisition process as noted previously. As such, current large pixel detectors are not suitable for higher speed or dynamic applications while the disclosed small pixel detectors can achieve both higher speed operation and high SNR by acquiring the image using smaller pixel elements with the appropriate pixel pitch-detector thickness geometry and binning the data subsequently to improve SNR.

For mammography tomosynthesis or mammography CT, pixel electrodes having a pitch of 25 um may be used with a selenium layer having a thickness of 250 um to enable continuous fast acquisition of X-ray data with minimal loss in X-ray quantum efficiency. In order to maintain SNR and reduce or minimize the X-ray dose to the patient, the pixels can be binned to 50×50 um "larger" pixels or even 75 um×75 um "larger" pixels prior to or after the data is acquired. As such, the detector of this disclosure could be potentially configured as an area detector, a line detector or a slot-scanning detector for use in screening and diagnostic mammography. The same approach could be applied towards lung cancer screening and tomosynthesis as well.

Figure 4:
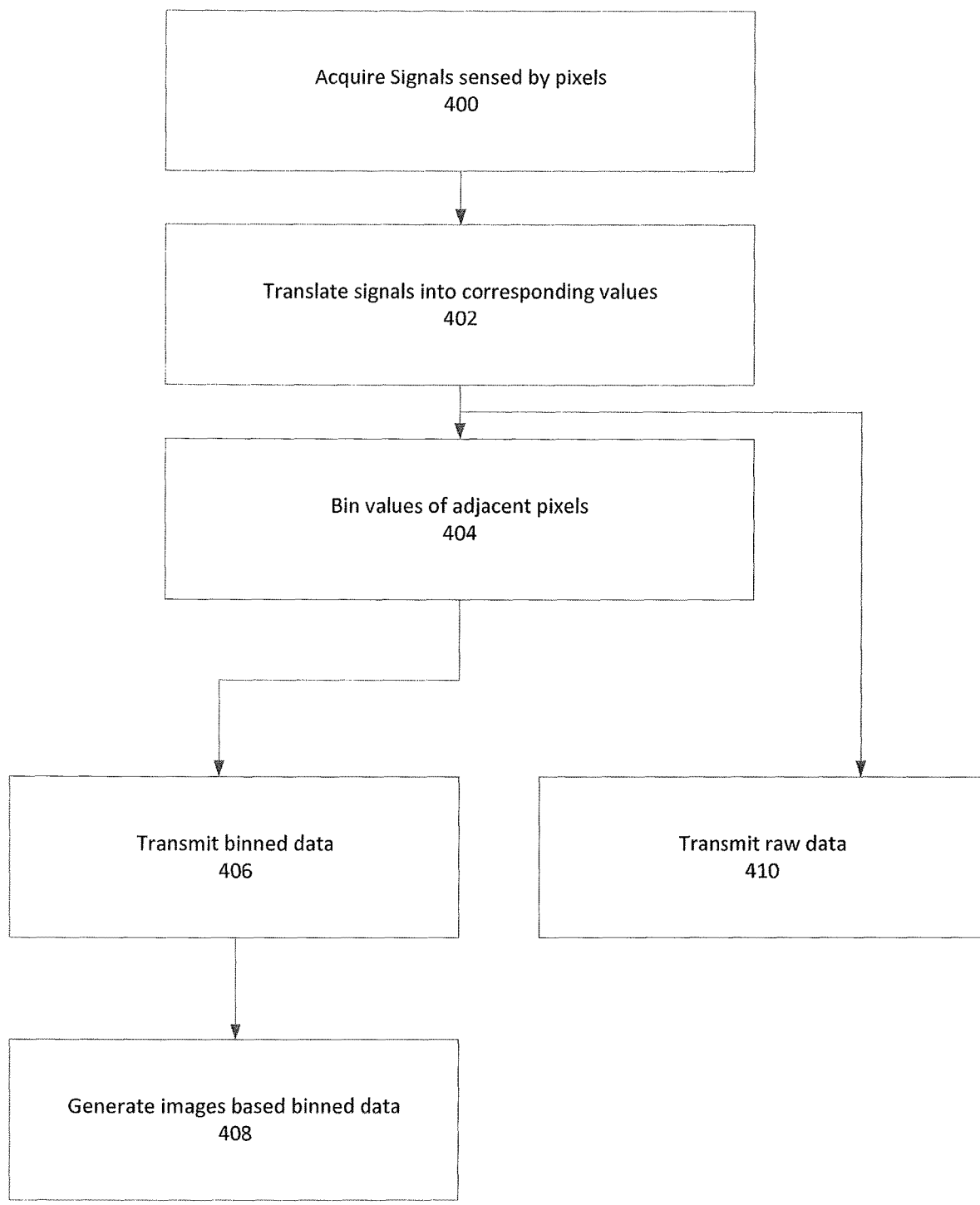
FIG. 4 is a flowchart outlining a method of high speed radiation image detection.

Turning to FIG. 4, a flowchart outlining a method of high radiation detection is shown. Initially, incident photons are directed at the object to be imaged. The signals resulting from the photons being directed at the object are captured or acquired by the system of the disclosure (400). As will be understood, the photons are captured by the individual pixel circuits (preferably having a pitch of less than or equal to 25 um) and then transmitted out via a set of readout electronics. The received photons may also be seen as raw data. As will be understood, the thickness of the photoconducting layer is at least three, and preferably at least five, times larger than the pitch of the individual pixel circuits. After receiving the signals from each of the individual "small" pixel circuits, these signals are then translated into corresponding values (402), which are then associated with each of the individual pixel circuits.

The values of adjacent pixels may then be binned (or added) together (404). Binning of the values allows these smaller pixels to be seen as larger pixels. The selection of which pixels to bin together is preferably pre-determined. For instance, a group of four pixels may be selected and their values binned, such as schematically shown in FIG. 5 whereby the 8×8 grid of small pixels (500) may be seen as a 4×4 grid of larger pixels (502) after the values of each predetermined group of pixels are binned together. Alternatively, a pair of adjacent pixels may be selected and their values binned. As will be understood, the pixels can be grouped in any number of ways.

Binning of the values may be performed in any number of ways, such as, but not limited to, the method disclosed in U.S. patent application Ser. No. 15/434,712, which is hereby incorporated by reference.

The binned values may then be transmitted (406), such as to a processor, so that an image can be generated (408) from the binned values. As will be understood, this image will preferably be a two-dimensional (2D) or three-dimensional (3D) image.

Although the signals may be binned, the raw values for each of the individual "small" pixel circuits may also be transmitted (410) after they have been calculated in 402. These raw values may then be used for any other applications such as, but not limited to, propagation based phase contrast imaging or specimen imagery.

One advantage of the system of the disclosure is that that since smaller pixels are used, the raw data that is received can be used for one imaging application while the binning of the raw data of multiple pixel elements allows for a different imaging application to use the binned values. Therefore, a single exposure of X-rays or photons can be used for at least two different applications which means that the patient may be subjected to less X-ray exposure than some current systems to obtain the same number of images.

One use of the raw data may be for phase contrast X-ray for breast imaging. Currently, phase contrast X-ray imaging is recognized as a modality that can image soft tissue with high contrast akin to Magnetic Resonance Imaging (MRI). There are many approaches to phase contrast imaging. The simplest approach however, known as propagation based phase contrast X-ray imaging, is limited in application only at synchrotron labs due to a system level challenge. Currently available large pixel size X-ray detectors require placement of the detector far away from the object to achieve the necessary phase contrast. However, the large distances require powerful X-ray sources and large X-ray exposures to the object (or patient) to acquire an image in a reasonable amount of time. Since high power X-ray sources are only available at synchrotrons, propagation phase contrast X-ray is limited to only those facilities.

With one embodiment of the disclosure, if a detector with small pixel elements (e.g. less than 10 um) is used, edge enhanced images using propagation based phase contrast imaging may be acquired at much smaller distances thus enabling fast acquisition along with a dose reduction to the object, which is beneficial for biological objects. One additional advantage is that edge enhanced phase contrast X-ray image data may be acquired in the same scan as the attenuation data. Moreover, all raw data can be acquired rapidly in real-time with minimal or reduced lag and MTF degradation. The binned data (such as disclosed above) can be used for traditional attenuation CT images while the unbinned (or raw) data provides the edge enhanced phase contrast X-ray CT image. If desired, a secondary X-ray exposure can be undertaken (after the exploratory attenuation CT scan has provided some context) to obtain an additional set of higher SNR, higher contrast, phase contrast edge enhanced images at a selected range of projection angles or regions of interest. Furthermore, the system of the disclosure may be applied to other applications such as micro-CT and phase contrast micro-CT for industrial, veterinary, scientific and life sciences imaging. It should be understood that the disclosed detector and method can be applied not only to propagation based phase contrast X-ray imaging but also other phase contrast imaging methods including coded aperture phase contrast imaging.

In another embodiment, the disclosure can also be applied to image high-energy electrons in transmission electron microscopy (TEM) applications. Since amorphous selenium has a higher atomic number and density compared to the incumbent single crystal silicon technology, it has a greater stopping power for electrons yielding a high SNR even for low energy electron beams. Being able to image low energy (40-80 keV) electron beams can potentially enable high contrast imaging of biological samples for extended periods of time, something that is not possible today with current silicon TEM detectors. Low keV beams are preferable for imaging because the biological sample lasts longer. This could have benefits, for example, in cryogenic electron microscopy (cryo-EM) applications. The benefits of very small pixel elements to improve scanning speed, image lag and MTF apply equally well to TEM where high resolution, high contrast images are desirable and minimizing sample scanning times, especially for biological samples, is a must.

EXPERIMENTATION

As discussed above, 'near-field effect' can potentially benefit amorphous semiconductors by improving the lag and MTF performance of integration mode radiation detectors if a semiconductor is appropriately chosen that suffers lag and MTF degradation from sources that can be overcome by the "near-field effect". For example, in amorphous selenium, electrons are the dominant source of lag so if one focuses on isolating the current signal from electrons using the "near-field effect", an improvement in lag could be potentially obtained.

In experimentation, the pixel element size, or pitch, was reduced in order to be less than 5 times the thickness of the photoconducting layer while still maintaining a reasonable photoconducting layer thickness. Smaller sized pixel elements were generated by integrating two technologies: an amorphous selenium semiconductor layer and a complementary metal oxide semiconductor (CMOS) pixel array. It will be understood that other materials may be contemplated. CMOS technology was selected due its ability to enable small pixels. This is challenging with amorphous silicon TFT pixel arrays. Moreover, CMOS technology also has very low electronic noise (on the order of 100 electrons) unlike amorphous silicon TFT technology (where the noise is typically 1000 electrons) which helps improve the pixel signal to noise ratio (SNR).

One challenge associated with decreasing pixel sizes is that the quantum noise becomes significant relative to the radiation signal detected at each pixel thus reducing the pixel signal-to-noise ratio (SNR). To overcome the quantum noise problem, additional radiation is required to obtain a readable image. As such, small pixel element X-ray detectors are uncommon today because smaller pixels have a reduced SNR yielding a device where the need for additional exposures to achieve a high SNR increases the potential for harm to biological objects, for example, in mammography screening or small animal imaging. In contrast, in industrial micro-computed tomography (micro-CT) imaging, higher resolution X-ray images are routinely obtained by utilizing a simple geometric magnification factor in the object-detector placement and increasing the radiation dose, thus enabling the use of large pixel detectors to obtain high-resolution images.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

We claim:

1. A system for producing images from incident radiation comprising:
    a top electrode layer;
    a continuous photoconducting layer;
    a set of bottom electrodes;
    a substrate layer; and
    a set of pixel circuits integrated within the set of bottom electrodes;
    wherein a thickness of the continuous photoconducting layer is at least three times thicker than a pitch of an individual pixel circuit;
    wherein the pitch is less than about 25 microns.

2. The system of claim 1 wherein each pixel circuit in the set of pixel circuits comprises:
    a storage capacitor; and
    a pixel readout circuit.

3. The system of claim 2 wherein the pixel readout circuit is made from CMOS, metal oxide, organic, or polysilicon semiconductor technology.

4. The system of claim 2 wherein the pixel readout circuit is an active pixel sensor, a passive pixel sensor or a photon counting pixel circuit.

5. The system of claim 1 wherein the continuous photoconducting layer is made from amorphous selenium, perovskites, an organic semiconductor; $HgI_2$, PbO, PbI or TlBr.

6. The system of claim 1 wherein the top electrode layer is an aluminum, gold, chromium or silver layer.

7. The system of claim 1 wherein each of the set of bottom electrodes is an aluminum bottom electrode.

8. The system of claim 1 wherein the pitch is less than about 20 microns.

9. The system of claim 1 wherein the pitch is less than about 15 microns.

10. The system of claim 1 wherein the pitch is less than about 10 microns.

11. A method of high-speed imaging comprising:
    sensing, via a detector having a set of pixel circuits with a pitch size of less than 25 microns and a continuous photoconducting layer having a thickness at least three times greater than the pitch size, a set of received radiation signals; and
    translating received radiation signals into corresponding values for each of the set of pixel circuits.

12. The method of claim 11 further comprising binning the corresponding values of predetermined groupings of pixel circuits.

13. The method of claim 12 further comprising:
    transmitting the binned values to a processor.

14. The method of claim 11 further comprising:
    transmitting the corresponding values to a processor.

15. The method of claim 11 wherein the continuous photoconducting layer has a thickness of at least five times the pixel pitch.

* * * * *